United States Patent [19]

Blake

[11] Patent Number: 5,390,960
[45] Date of Patent: Feb. 21, 1995

[54] CONDUIT BRANCH FITTING FOR FLUID MAIN LINE

[76] Inventor: Willard R. Blake, 7939 Humboldt Ave. North, Minneapolis, Minn. 55444

[21] Appl. No.: 73,567

[22] Filed: Jun. 9, 1993

[51] Int. Cl.⁶ .......................... E03F 3/04; F16L 27/12
[52] U.S. Cl. .............................. 285/3; 285/156; 285/302; 239/204; 405/37
[58] Field of Search .................. 285/3, 156, 301, 302, 285/303, 304, 298, 299; 138/105; 239/200, 201, 202, 203, 204, 205, 206, 207; 52/169.5, 169.7; 405/37, 41

[56] References Cited

U.S. PATENT DOCUMENTS

| | | | |
|---|---|---|---|
| 621,448 | 3/1899 | Dwyer | 285/298 |
| 901,545 | 10/1908 | Morrison | 285/298 |
| 1,123,705 | 1/1915 | Dehn | 285/298 |
| 1,890,618 | 12/1932 | Le Duc | 285/298 |
| 2,268,263 | 12/1941 | Newell et al. | 5/22 |
| 2,329,876 | 9/1943 | Castellano | 285/166 |
| 2,670,976 | 3/1954 | Owen | 288/4 |
| 2,968,440 | 1/1961 | Cone | 239/203 |
| 3,083,914 | 4/1963 | Smith et al. | 239/203 |
| 3,084,869 | 4/1963 | Hutty et al. | 285/302 |
| 3,118,609 | 1/1964 | Glover | 239/207 |
| 3,169,786 | 2/1965 | Cator | 285/3 |
| 3,317,144 | 5/1967 | Muschett | 239/204 |
| 3,369,828 | 2/1968 | Trickey | 285/302 |
| 3,416,819 | 12/1968 | Day | 285/302 |
| 3,537,471 | 11/1970 | Houle | 285/302 |
| 3,558,144 | 1/1971 | Corbett et al. | 277/208 |
| 3,594,021 | 7/1971 | Williams | 285/302 |
| 3,637,239 | 1/1972 | Daniel | 285/93 |
| 3,650,549 | 3/1972 | Pepper | 285/27 |
| 3,684,179 | 8/1972 | Fischer et al. | 239/203 |
| 3,873,137 | 3/1975 | Yamaguchi | 285/226 |
| 3,879,067 | 4/1975 | Keyser | 285/110 |
| 4,027,903 | 6/1977 | Hannover | 285/298 |
| 4,283,078 | 8/1981 | Ross et al. | 285/300 |
| 4,314,717 | 2/1982 | Bjurman | 285/226 |
| 4,526,409 | 7/1985 | Schaffer | 285/301 |
| 4,715,624 | 12/1987 | Frye | 285/55 |
| 4,718,700 | 1/1988 | Horch et al. | 285/156 |
| 4,810,008 | 3/1989 | Brodie | 285/31 |
| 4,921,282 | 5/1990 | Meisinger | 285/104 |

FOREIGN PATENT DOCUMENTS

| | | | |
|---|---|---|---|
| 168100 | 1/1986 | European Pat. Off. | 285/298 |
| 7605576 | 1/1977 | Netherlands | 285/302 |

*Primary Examiner*—Eric K. Nicholson
*Attorney, Agent, or Firm*—Nawrocki, Rooney & Sivertson

[57] ABSTRACT

A fitting for mating a fluid flow main line, such as a sewage disposal line, with a branch line to a residence, industrial building, or commercial building intended to be serviced. The fitting is mated to a T interposed in the main line which the branch line is intended to intersect. The fitting is, in turn, at its end opposite that by which it is mated to the T, interfitted to the branch line to provide for relative telescoping movement between the fitting and the branch line. Damage to the main line as a result of settling of the earth in which the branch line is buried is protected against.

6 Claims, 4 Drawing Sheets

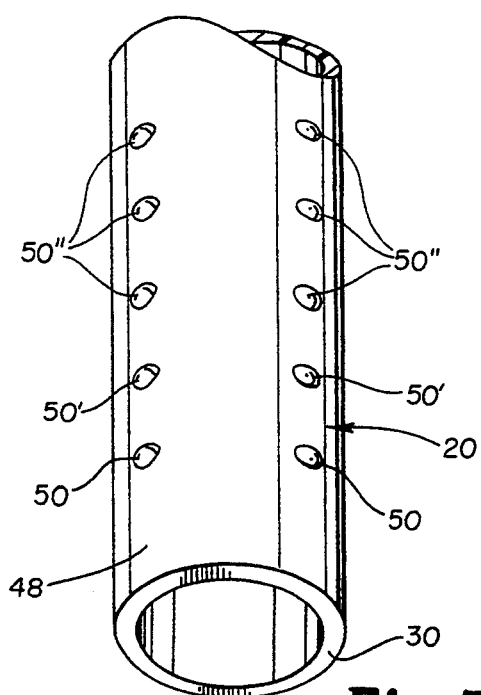
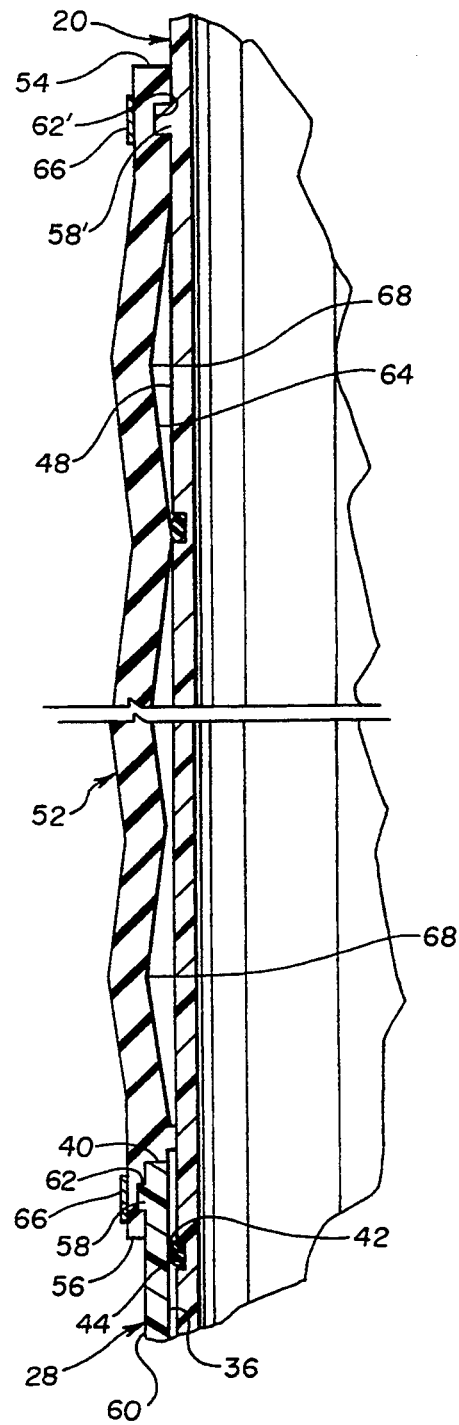
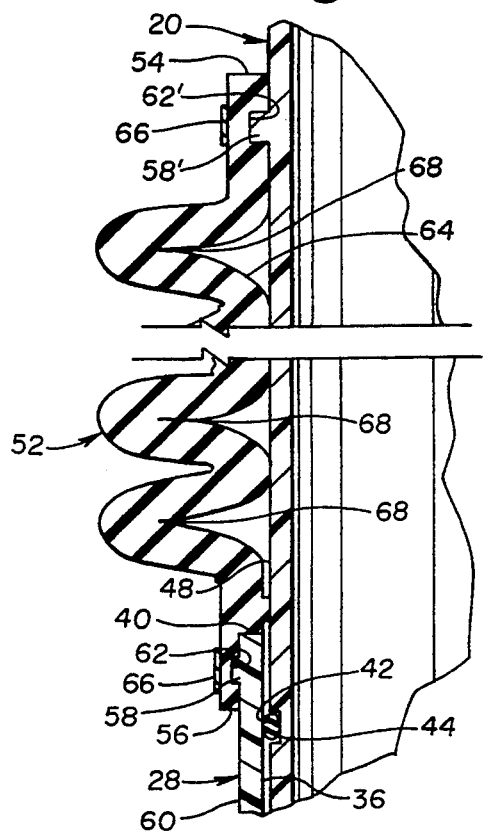

CONDUIT BRANCH FITTING FOR FLUID MAIN LINE

TECHNICAL FIELD

The present invention deals broadly with the field of systems for conveying fluids and sludge materials. More narrowly, however, the present invention deals with the field of systems for conveying waste materials through lines buried beneath the ground. The specific focus of the invention is the provision, in such systems, of a branch line from the sewer main line, wherein a fitting is provided to preclude damage to the branch and the sewer main as a result of settling of the branch line after the branch has been connected to the main and buried beneath the ground.

BACKGROUND OF THE INVENTION

While in rural areas, septic tank systems are, typically, provided for the treatment and dispersal of waste, in urban and suburban areas, sewer main systems are provided for conveyance and disposal of wastes prior to treatment and dispersal. Such sewer main systems service residential, commercial, and industrial units.

Sewer main lines, typically, are laid horizontally beneath the ground. While circumstances, such as deterioration over time and subjection to extremely high pressures, can occasion the need for replacement or repair of a sewer main, once a sewer main conduit is in place, it is lying on a bed at the bottom of an excavation and is not subject to major settling.

When a new location along a service main line is to be provided for, the area above the sewer main is excavated and a T is installed in the main. Such connection locations can be installed at various spaced locations along the main to provide access to a multiplicity of individual units.

Typically, such T connections extend generally vertically, from the main line as is illustrated in FIG. 1 of the drawing figures. A conduit mated to such a T coaxially therewith to provide service to, for example, an individual residence angles off of the axis of the T more horizontally in order to provide a duct over the full distance from the unit being serviced to the main line.

Such individual branch connections are, frequently, extended from a main line at some significant time after the installation of the main itself. When excavation is performed to install such a branch, after the installation is completed, the hole is filled with loose earth. When earth is filled into the hole, excavated for installation of the length of the branch line pipe, downward pressure is brought to bear upon the generally horizontal portions of the line. Such pressure is, in turn, conveyed to the vertical portion of the branch line and the T intersecting the sewer main. While the full application of the force vector may not be completely vertical, at least a component thereof is applied in a direction along the axis of the T.

This force vector causes problems as the branch settles. As previously indicated, the main line is seated on a substantially stable bed. This is so, since the main line is, tpyically, laid at the bottom of the excavation and on the top of already-settled earth. As settling of the earth fill dumped into the hole after the branch line is installed occurs, the T and vertical portion of the branch line will tend to be urged into the main line. The consequence of this force is, at a minimum, a tendency to incur minor cracking. In some cases, however, complete fracture at the Location at which the T exits from the main line results.

It is to these problems of the prior art that the present invention is directed. It is a mating structure which permits the installation of a branch line for servicing of a residence, a commercial unit, or an industrial structure without consequent cracking or fracture at the interface between the service connection and the main service line.

SUMMARY OF THE INVENTION

The present invention is an apparatus for protecting the intersection of a T with a main line, wherein a branch line is to be mated to the T, from the deleterious effects of settling of the branch line. The apparatus functions to effect mating of the branch line to the T carried by the main line when the main line is excavated for this purpose. The apparatus includes a fitting carried by the T. The fitting is so constructed that the branch line and the fitting interfit relative to one another for relative telescoping movement.

In the preferred embodiment, tile branch line and a conduit segment comprising the fitting are tubular members. The conduit segment is provided with an inside diameter substantially the same as an outside diameter of the branch line. For this reason, therefore, in this embodiment, the male branch line extends downwardly and is received within the female conduit segment. Leakage of fluid flowing downwardly through the branch line into the conduit segment is, thereby, inhibited.

To further inhibit leakage of fluids so flowing, sealing means between the branch line and the conduit segment can be provided. In one embodiment, such sealing means can take the form of an O-ring seal interposed between the inner surface of the conduit segment and the outer surface of the branch line. In order to maintain this O-ring seal at a desired location, a recess can be formed in either the inner surface of the conduit segment or the outer surface of the branch line.

In another embodiment, the sealing means can take the form of a pair of O-ring seals, one seated in a recess formed in each of the inner surface of the conduit segment and the outer surface of the branch line. A flexible annular sheet is provided to interconnect the two-ring seals seated in these recesses. A "rolling seal" is, thereby, provided.

As previously discussed, telescoping of the branch line into the conduit segment is desirable in order to accommodate settling of the branch line so as to inhibit fracture of the intersection of the T at the main line. It is, therefore, desirable that the branch line be maintained, initially, at a relatively withdrawn position relative to the conduit segment. Means can be provided to effect maintenance of this relatively withdrawn positioning at the time of installation.

In one embodiment, such maintenance can be effected by providing one or more shearable rings received within corresponding annular recesses formed in the inner wall of the conduit segment. At installation, the lower end of the branch line would be inserted into the conduit segment in which it is intended to be received until the lower end of the branch line engaged an uppermost of such rings. After mating is completed and the branch line is properly run to the unit which it is intended to service, the excavation is filled with loose earth. As that earth settles over time, pressure exerted upon horizontal portions of the branch line will urge the branch line downwardly within the conduit segment. As the pressure increases beyond a certain level, the ring defining the shoulder against which the lower end of the branch line is engaged will shear. The lower end of the branch line will then be able to move downwardly until it engages the next ring. As settling continues, downward movement of the branch line will occur in a sequence as described above.

It will be understood that the rings seated in recesses in the inner wall of the conduit segment to obstruct downward movement of the branch line could be formed of any appropriate frangible material. It is envisioned, however, that these rings would be formed of plastic.

Other embodiments envision additional ways of effecting this initial relative positioning of the branch line relative to the conduit segment, and downward relative movement at intervals. One embodiment employs a series of frangible beads formed on the outer surface of the branch line. A first set of, for example, three beads could be formed at a defined axial distance from the end of the branch line. These beads could be spaced angularly from one another at 120°.

This set of beads would, at the time of installation, be engaged by the upper axial end of the conduit segment. Second and third sets of such beads could be spaced at axial intervals from the first set so that, as the first and subsequent sets of beads are fractured as a result of settling, the upper end of the conduit segment would come to engage the next upwardly set of beads.

Another embodiment envisions a sleeve or "boot" encircling the interfitting of the branch line and the conduit segment comprising the mating fitting. An upper end of the boot is secured at a location on the outer surface of the branch line. A lower end of the boot is secured at a position along the outer surface of the conduit segment.

The boot is provided with a series of accordian folds, although the folds are, when the boot is not subjected to significant axial pressure, maintained at defined angles relative to one another. That is, the boot is substantially rigid when axial pressure urging the branch line into the conduit segment is absent. As such pressure is imparted, however, the accordian like folds will fold back on themselves and permit downward movement of the branch line relative to the conduit segment.

The present invention is, thus, apparatus for protecting an intersection of a branch line with a main line of, for example, a sewage disposal system. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 5 is a fragmentary perspective view of a portion of the first alternate form of the invention;

FIG. 6 is a fragmentary sectional view showing a second alternate form of the invention;

FIG. 7 is a fragmentary sectional diagram of the second alternate form of the invention showing a secondary position thereof.

DETAILED DESCRIPTION OF THE INVENTION

Figure 1:
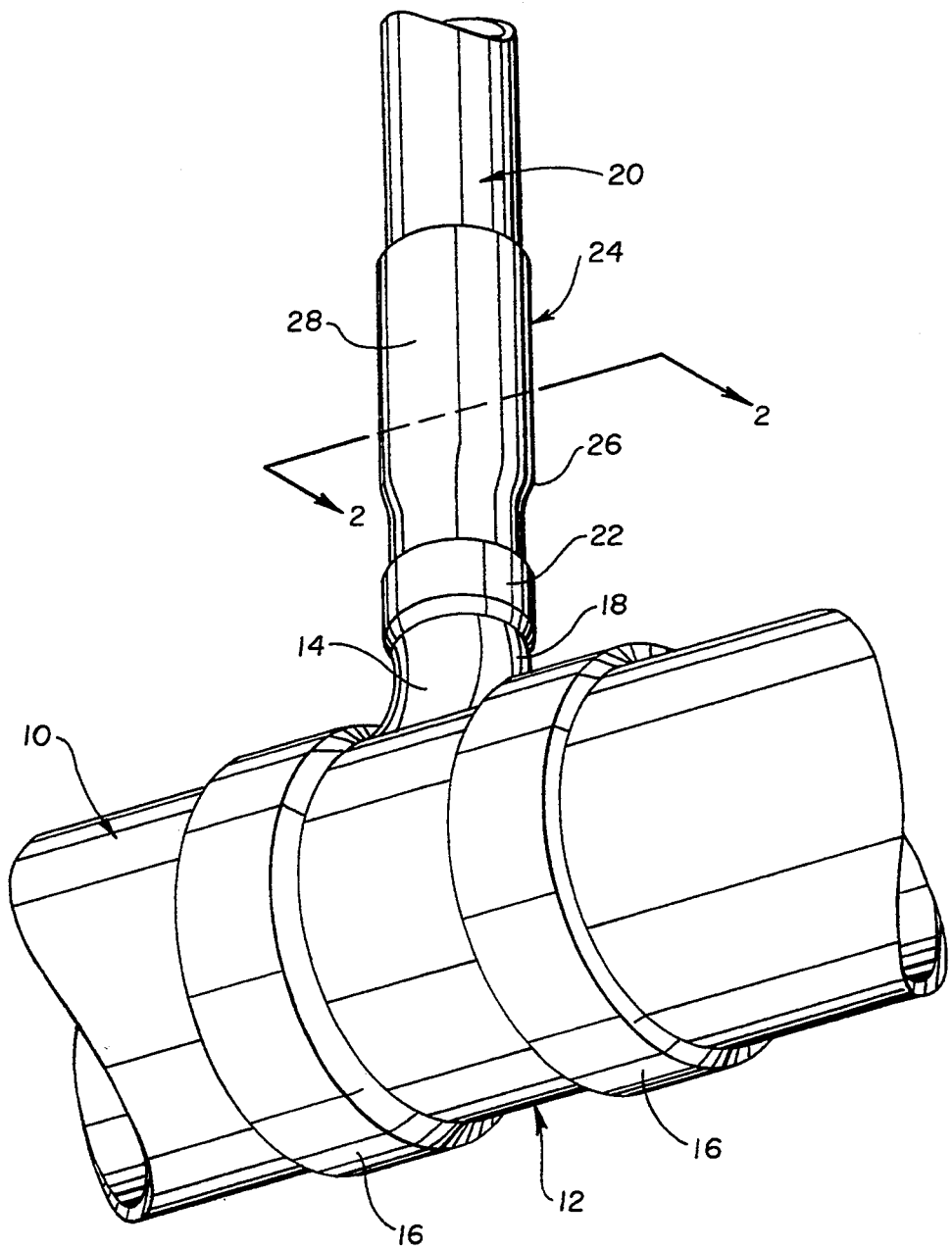
FIG. 1 is a perspective view of a T fitting in a main fluid flow line, a branch line being mated to the T.

Referring now to the drawings wherein like reference numerals denote like elements throughout the several views, FIG. 1 illustrates, in perspective, a structure in accordance with the present invention. FIG. 1 illustrates a main fluid flow line 10 (i.e., a sewage main line for conveying sewage for disposal, treatment, etc.). The main sewage flow line 10 is shown as having a T fitting 12 interposed therein. The T fitting 12 is provided with a portion 14 having a diameter substantially the same as the main 10. That portion 14 is mated to the main 10 by flanges 16 at opposite axial ends thereof.

The T 12 also has a stub portion 18 which extends generally perpendicular to the run of the main 10. The stub portion 18 of the T 12 is intended to be mated to a branch line 20 extending to a residence, commerical building, or industrial location.

The stub portion 18 of the T 12 is provided with a flange portion 22 to effect mating to the branch line 20. Interposed between the stub portion 18 of the T 12 and the branch line 20 is a fitting 24 in accordance with the present invention. This fitting 24 will be described hereinafter with reference to FIGS. 2-8.

It will be understood that T fittings, one of which is illustrated in FIG. 1, are disposed at various locations along the main 10. Each location defines a station at which a branch line 20 from, for example, a residence intersects the main 10.

Additionally, it will be understood that the branch line 20, while only a vertically extending portion is illustrated, angles to, for example, a residence which it is intended to service in a more horizontal disposition farther up the branch line 20. It is, as previously discussed, the horizontally-extending portion of the branch line 20 which creates the problem the present invention is intended to solve.

Figure 3:
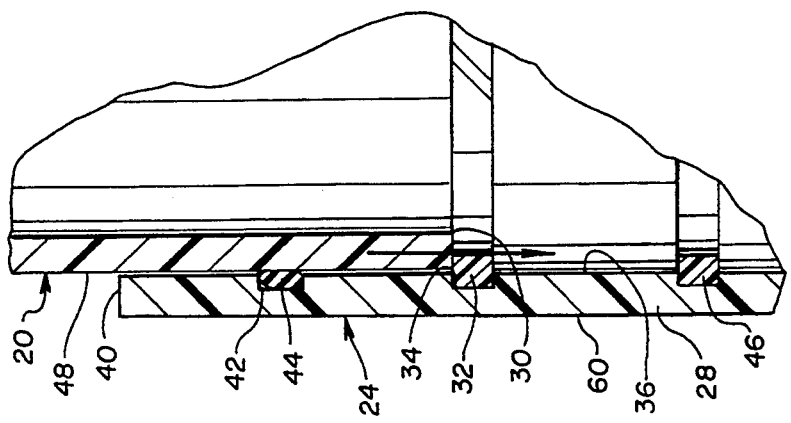
FIG. 3 is a fragmentary detailed view of a portion of FIG. 2.
Figure 2:
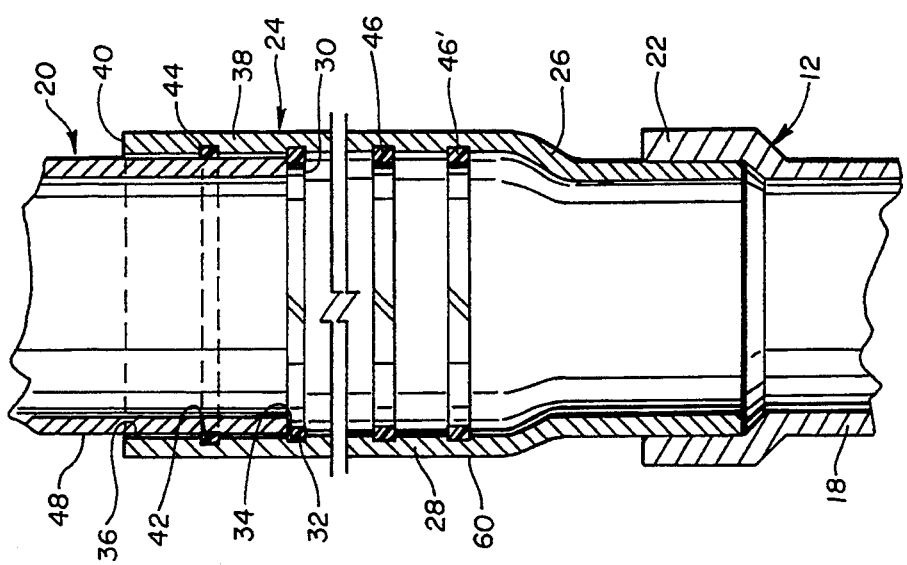
FIG. 2 is a sectional view taken along the line 2—2 of FIG. 1.

A first embodiment of the invention is illustrated in FIGS. 2 and 3. The fitting 24 in accordance with the present invention is received within the stub portion 18 of the T 12 and is held in place by the flange 22 at the upper end of the stub portion 18. The fitting 24 has a downwardly and inwardly tapering portion, as at 26, which serves as a stop to preclude further downward relative movement of the branch line 20 beyond the shoulder defined by this tapering portion 26.

In any event, however, the branch line 20 is installed within a conduit segment 28 comprising the fitting 24 so that, upon installation, the branch line 20 is only partially coextensive with the conduit segment 28. That is, the lower end 30 of the branch line 20 is spaced considerably above the shoulder defined by the tapering portion 26 of the fitting 24.

Absent the branch line 20 being held at this relative location, it is free to telescope downwardly within the conduit segment 28 until it achieves a position in engagement with the tapered shoulder 26. FIGS. 2 and 3, however, illustrate a first ring 32 seated in an annular recess 34 formed in the inner surface 36 of the conduit segment 28. Since the outer diameter of the branch line 20 is substantially the same as the inner diameter of the expanded portion 38 of the fitting 24, radially inward protrusion of this ring 32 will define an axial shoulder against which the lower end 30 of the branch line 20 will bear at the time of installation. FIGS. 2 and 3 illustrate the relative positions of the branch line 20 and the conduit segment 28 at the time the excavation dug to effect mating is filled with excavated earth.

It will be noted that an axial location on the inner surface 36 of the conduit segment 28 between the upper end 40 of the conduit segment 28 and the initial position of the lower end 30 of the branch line 20 is provided with an annular recess 42 in which an O-ring 44 is seated. This O-ring 44 functions to seal the inside of the interfitted tubes from outside intrusions. Consequently, contamination of the surrounding earth and, potentially, ground water is unlikely. Additionally, surrounding earth will be precluded from entering the branch conduit/fitting assembly, and potential plugging of the branch line and/or sewer main will be obviated.

FIG. 2 also illustrates additional rings 46, 46' for maintaining the branch line 20 in a position spaced upwardly from the tapered shoulder in the fitting 24. One of these additional rings 46 is illustrated in FIG. 3.

After the branch line 20 is installed in the fitting 24, the excavation created for the purposes of mating the branch line 20 to the main line 10 is filled with loose earth dug out to create the excavation. As previously discussed, this earth will settle, and the branch line 20 will settle along with the loose earth. This settling effects an increased pressure downwardly upon the vertical portion of the branch line 20. When the force achieves a level greater than what the retaining ring 32 seated in the annular recess 34 in the inner surface 36 of the conduit segment 28 can endure, the ring 32, manufactured from a fracturable material, will shear, and the branch line vertical portion will drop within the conduit segment 28.

Eventually, settling will allow the vertical branch line segment to move downwardly and into engagement with the next sequentially lower retaining ring 46. Again, the branch line 20 will be maintained in a defined location relative to the fitting 24 until a time at which the second retaining ring 46 shears. As a consequence, downward movement of the branch line 20 will, again, occur. It is intended that the length of the expanded portion 38 of the conduit segment 28 be sufficient to account for any settling that might occur. The deterence of downward movement caused by the retraining rings 32, 46, 46' will, of course, facilitate a certain length of the expanded portion 38 of the fitting 24 being sufficient.

Figure 4:
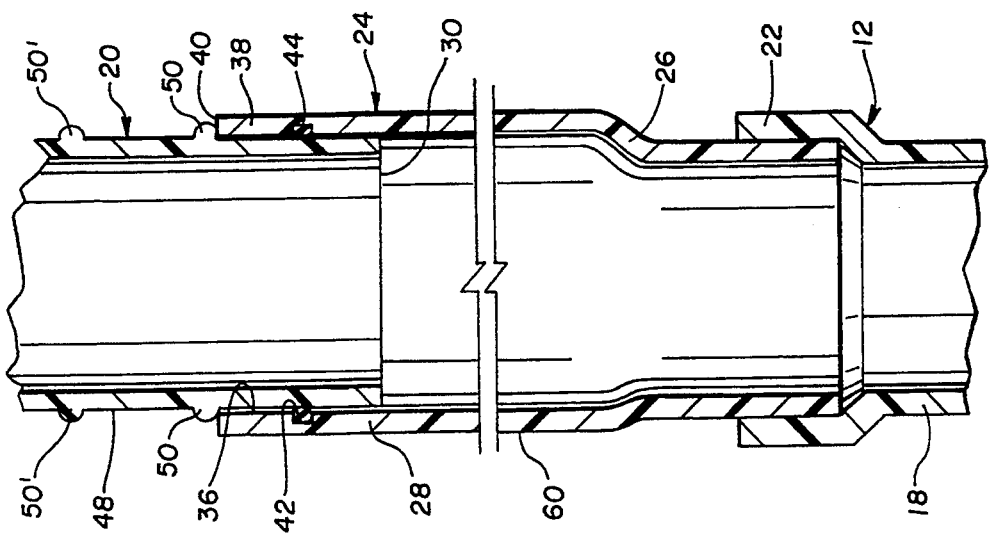
FIG. 4 is a view, similar to FIG. 2, showing a first alternate form of the invention.

FIGS. 4 and 5 illustrate an alternative form of the invention. In that embodiment, the inner surface 36 of the conduit segment 28 is provided with an annular recess 42 for reception of an O-ring seal 44. No other recesses are, however, formed in the inner surface 36 of the conduit segment 28. Rather, the outer surface 48 of the branch line 20 is provided with one or more sets of frangible beads 50, 50', 50". The beads 50, 50', 50" in each set are spaced angularly about the outer surface 48 of the branch line 20 at distances from the lower end 30 of the branch line 20 which are equal.

It will be understood that each set of beads 50, 50', 50" can include a single bead. In such a case, the beads in the various sets would probably be aligned in an axial direction along the outer surface 48 of the branch line 20.

When each set includes more than one bead, it is intended that beads in any one set be spaced at equal angles about the outer surface 48 of the branch line 20. That is, if two beads were provided in a set, they would be spaced at 180° from one another. If three beads were provided in a set, they would be angularly spaced at 120° relative to one another.

Similar to the first embodiment of the invention, an initial installation relationship would be defined when the upper end 40 of the conduit segment 28 was in engagement with the bead or beads 50 in the lowermost set. As pressure resulting from settling would occur, the frangible beads 50 would fracture and allow telescoping movement of the branch line 20 into the conduit segment 28 until the upper end 40 of the conduit segment 28 came into engagement with the second set of beads 50'.

FIGS. 6 and 7 illustrate another embodiment of the invention. In this embodiment, a sleeve or "boot" 52 is provided, the sleeve or boot 52 encircling the interfitting of the branch line 20 and conduit segment 28. An upper end 54 of the boot 52 is substantially rigidly mated to the outer surface 48 of the branch line 20, and the lower end 56 of the boot 52 is substantially rigidly mated to the outer surface of the conduit segment 28. Mating can be accomplished by providing an annular detent 58, 58' in each of the outer surfaces 60, 48 of the conduit segment 28 and the branch line 20, which annular detents 58, 58' can snap into corresponding annular recesses 62, 62' formed in the inner wall 64 of the boot 52. If desired, a strap 66 could be secured around the boot 52, at each axial location where a detent 58, 58' is received within a recess 62, 62', to more securely mate the boot 52 to the branch line 20 and conduit segment 28.

The boot 52 is shown as being provided with a plurality of accordian-like folds 68 The boot 52 it is envisioned would be formed from an elastomer-type material. As a result, the boot 52 would be substantially rigid, although, whenever a defined threshhold pressure, exerted in an axial direction by the settling of the branch line 20, is exceeded, the accordian-like folds 68 would fold back upon one another to permit telescoping of the branch line 20 into the conduit segment 28.

Figure 8:
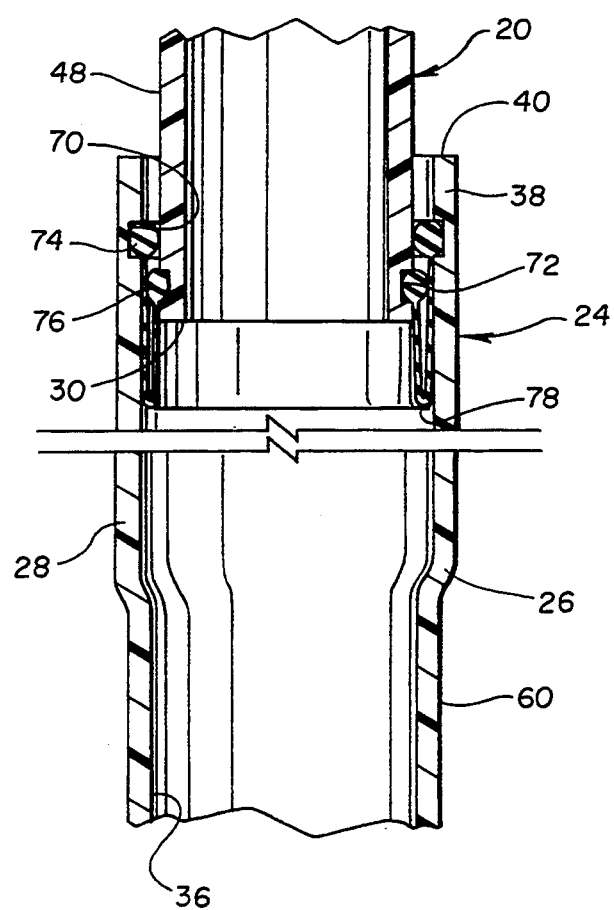
FIG. 8 is a fragmentary sectional view showing an alternate sealing means.

FIG. 8 illustrates an alternative embodiment of a sealing means. FIG. 8 shows a conduit segment 28 having an annular recess 70 formed in the inner surface 36 thereof, and a branch line 20 having an annular recess 72 formed in the outer surface 48 thereof. A "rolling seal" mechanism is inserted between the branch line 20 and the conduit segment 28. The rolling seal comprises a pair of O-ring structures 74, 76 interconnected by an annular sheet 78. A first of the O-ring structures 74 is received within the recess 72 formed in the outer surface 48 of the branch line 20, and a second of the O-ring structures 76 is received in the annular recess 70 formed in the inner surface 36 of the conduit segment 28. As the branch line 20 telescopes within the conduit segment 28, the annular sheet 78, integrally formed with the O-rings 74, 76, will adjust. A more positive seal is, thereby, provided.

Numerous characteristics and advantages of the invention covered by this document have been set forth in the foregoing description. It will be understood, however, that this disclosure is, in many respects, only illustrative. Changes may be made in details, particularly in matters of size, shape, and arrangement of parts, without exceeding the scope of the invention. The invention's scope is, of course, defined in the language in which the appended claims are expressed.

What is claimed is:

1. Apparatus for mating an upwardly extending T-shaped member of a generally horizontal main line for conveying fluid material beneath the ground, to a generally vertically-disposed, upwardly-extending branch line, comprising:
   (a) a conduit segment carried by the T-shaped member of the main line, said conduit segment having an inside diameter approximating an outside diameter of the branch line such that the branch line can be received within said conduit segment and interfitted relative thereto for telescoping movement relative to said conduit segment; and
   (b) a generally annular sleeve receiving therewithin the interfitting of said conduit segment and the branch line, said sleeve having an upper end securely mated to an outer surface of the branch line and a lower end securely mated to an outer surface of said conduit segment, said sleeve having formed therein a plurality of accordion folds sufficiently rigid so that, as an assembly of the main line and branch line is installed in an excavation in which such an assembly is intended to be received, the branch line will be maintained at a desired axial location relative to said conduit segment, yet sufficiently collapsible so that, as settling of the branch line occurs after filling of the excavation, said accordion folds will fold back on each other to permit relative telescoping movement of the branch line into said conduit segment.

2. Apparatus for mating an upwardly extending T-shaped member of a generally horizontal main line for conveying fluid material beneath the ground, to a generally vertically-disposed, upwardly-extending branch line, comprising:
   (a) a conduit segment carried by the T-shaped member of the main line, said conduit segment having an inside diameter approximating an outside diameter of the branch line such that the branch line can be received within said conduit segment and interfitted relative thereto for telescoping movement relative to said conduit segment; and
   (b) at least one set of frangible beads formed on an outer surface of the branch line at a common axial location, a first set of said at least one set of frangible beads, initially, upon insertion of the branch line into said conduit segment, engaging an upper axial end of said conduit segment.

3. Apparatus in accordance with claim 2 further comprising at least one additional set of frangible beads spaced axially upwardly on the outer surface of the branch line from the first set of said at least one frangible bead sets initially engaging the upper end of the conduit segment.

4. Apparatus in accordance with claim 1 further comprising sealing means between said conduit segment and the branch line.

5. Apparatus in accordance with claim 4 wherein said sealing means comprises an annular O-ring seal received between said conduit segment and the branch line.

6. Apparatus in accordance with claim 4 wherein an inner surface of said conduit segment and an outer surface of the branch line have an annular recess formed therein and wherein said sealing means comprises:
   (a) a first O-ring seal received in said recess formed in said conduit segment;
   (b) a second O-ring seal received in said recess formed in the branch line; and
   (c) a flexible annular sheet interconnecting said first and second O-ring seals.

* * * * *